United States Patent [19]

Simon

[11] Patent Number: 5,065,872

[45] Date of Patent: Nov. 19, 1991

[54] DUAL ACCESS STORAGE AND RETRIEVAL SYSTEM

[75] Inventor: David Simon, East Brunswick, N.J.

[73] Assignee: White Storage & Retrieval Systems, Inc., Kenilworth, N.J.

[21] Appl. No.: 594,344

[22] Filed: Oct. 5, 1990

[51] Int. Cl.$^5$ ............................................. A47F 5/00
[52] U.S. Cl. ................................ 211/122; 312/198; 312/201; 312/268; 198/793; 198/803.13; 198/803.14
[58] Field of Search ............... 211/122, 1.5; 312/198, 312/201, 202, 268, 134, 135, 132; 198/799, 793, 803.14, 803.13

[56] References Cited

U.S. PATENT DOCUMENTS

| | | |
|---|---|---|
| 249,800 | 11/1881 | Smith . |
| 257,703 | 5/1882 | Hilbers . |
| 1,347,936 | 7/1920 | Carroll . |
| 2,808,939 | 10/1957 | Gemerek . |
| 3,290,104 | 12/1966 | Brautovich . |
| 3,368,688 | 2/1968 | Weiss et al. . |
| 3,669,372 | 6/1972 | DeJong . |
| 3,780,852 | 12/1973 | Weiss et al. . |
| 4,024,947 | 5/1977 | Knolle ............................ 198/792 X |
| 4,256,355 | 3/1981 | Yamaguchi et al. ............... 312/198 |
| 4,307,922 | 12/1981 | Rhodes ............................. 312/198 |
| 4,379,602 | 4/1983 | Iemura et al. . |
| 4,412,772 | 11/1983 | Naito et al. ..................... 312/198 X |
| 4,531,789 | 7/1985 | Iemura et al. . |
| 4,574,962 | 3/1986 | Tabler et al. . |
| 4,595,106 | 6/1986 | Kunze et al. . |
| 4,625,874 | 12/1986 | Abe et al. . |
| 4,801,236 | 1/1989 | Katzenschwanz . |
| 4,821,888 | 4/1989 | Hankes . |
| 4,876,940 | 10/1989 | Aloi et al. .................. 198/803.13 X |
| 4,883,401 | 11/1989 | Kavieff . |
| 4,890,718 | 1/1990 | Colamussi . |

OTHER PUBLICATIONS

"Up in the Air About Filing Space?", Advertisement of Gerard Metal Craftsmen.
"Storage/Retrieval Solutions for Distribution", Brochure by White Storage and Retrieval Systems, Inc.
"The Carousel Story", Brochure by White Storage and Retrieval Systems, Inc.

Primary Examiner—Robert W. Gibson, Jr.
Attorney, Agent, or Firm—Lerner, David, Littenberg, Krumholz & Mentlik

[57] ABSTRACT

A storage, transportation and retrieval system, and accompanying storage racks, are disclosed for increasing the effective storage capacity of the storage racks, providing simultaneous access to two adjacent storage racks, requiring less call-ups to locate desired items. The system is so arranged that it can be implemented to occupy less area. The storage racks are constructed to provide access to its storage area from at least either side of the storage rack. The system is arranged to move the storage racks in a path which may be of virtually any shape. A circular or substantially similar path imparts the advantages of permitting ready access to any two adjacent storage racks.

38 Claims, 5 Drawing Sheets

DUAL ACCESS STORAGE AND RETRIEVAL SYSTEM

BACKGROUND OF THE INVENTION

The present invention relates generally to apparatus for the storage, transportation and retrieval of articles for a variety of applications, including increased storage and improved productivity; and more particularly to automated closed loop storage transportation and retrieval carousels which optimize temporary or permanent storage, improve productivity in factories, offices or warehouses for article retrieval, facilitate product testing, and fulfill other similar objectives.

The manufacturing and service industries in all fields have dedicated considerable time, money and effort in developing storage, transportation and retrieval systems for the primary intertwined purposes of increasing storage and increasing productivity, though several other advantages are realized through the employment of such systems. These systems provide not only consolidated storage to conserve valuable space, but also facilitate increased productivity since the stored articles can be arranged closer to a work station, thus being more readily available to the operator of such a system. Such consolidation and increased productivity are possible since the storage bins of automatic carousel systems can be closely juxtaposed with one another as well as vertically elongate to thereby increase the storage capacity. Further, several carousel systems can be arranged quite close to one another since retrieval is automated from one side only. The difficulty in locating desired documents among a large number of documents is also eliminated since the identification and/or location of such documents can be used to index to the work station the storage bin in which the desired documents are stored.

Such a system is disclosed in U.S. Pat. No. 3,368,688 which provides for the storage, transportation and retrieval of documents, file folders and the like. The system in this patent comprises a plurality of racks on an endless oblong track, the racks being driven on said track by a motor. As with most systems of this type, it is intended that access to the stored articles be had at either end of the oblong structure. Indeed, where several systems are closely juxtaposed along their elongate sides, it is only possible to gain such access from either end of each carousel.

Despite the vast benefits and advantages which flow from the use of such automated carousel systems, there are shortcomings which have not been addressed by the manufacturers of such systems. One such disadvantage is that access to the storage compartments in the individual bins is limited not only to the ends of the individual carousels, but also to a single bin at a time.

Further, the depth of a storage rack is typically determined by the depth of material to be stored. Some materials may not be stored greater than one row deep (e.g., file folders, compact discs, videos, etc.), while others may be stored in multiple depth only with use of pull-out trays. Use of pull-out trays requires additional time, work space and handling which is sometimes unacceptable.

Even in instances in which a single carousel is provided or in which there is room between adjacent carousels to gain access to all storage racks, there remain shortcomings. It is undesirable to have the operator walk from storage rack to storage rack in order to store or retrieve articles. This defeats the very purpose of providing an automated carousel, and multiplies the time required to store and retrieve articles, as well as requiring additional and unnecessary aisle space.

Nevertheless, there are situations in which it is desirable to gain access to a large number of articles stored on the same carousel from several work stations and in a relatively small area. Indeed, it may be desirable to have operators move from one work station to another, yet maintain the capability of accessing articles on the carousel. With conventional carousels, it is impractical and improbable that an operator would be required to man both stations since these stations are typically quite far apart. Conventional carousels are oblong, and provide only two possible areas of retrieval—at either end of the elongate carousel. Further, because there are several storage racks provided on conventional oblong carousels, valuable time is required to index certain storage racks to the work station, and therefore all articles on the carousel are not quickly and readily available.

The above-noted shortcomings with respect to the storage transportation and retrieval of articles makes it apparent that significant and long-awaited improvements in the construction and arrangement of storage and retrieval systems are desirable. The present invention addresses such shortcomings and others not mentioned above.

SUMMARY AND OBJECTS OF THE INVENTION

The present invention specifically relates to an apparatus for the storage, transportation and retrieval of articles having a frame, and a plurality of storage racks arranged one adjacent another on the frame, each storage having at least one storage compartment and being movable along a path between storage positions and access positions, whereby at least a portion of the path of movement is arcuate. The storage racks are so constructed and arranged on the frame that the storage compartments of two adjacent storage racks can be accessed at a given access position.

The path of movement of the storage racks in the above system is endless, and the movement of storage racks can be automated with control means for indexing a desired storage rack or two desired storage racks to the access position. The storage racks can have storage compartments on both sides thereof, or on both sides or either side and the front thereof. The path of movement can be of any suitable shape, but is preferably oblong with semi-circular end portions and elongate portions therebetween. A circular path of movement can be provided on a system having only a few storage racks, thereby providing quick and ready access to any two storage racks from several work stations about the circular path of movement. A larger system consisting of several automated carousels can be developed utilizing the principals of the present invention.

Thus, it is an object of the present invention to provide a system for the storage, transportation and retrieval of articles in which simultaneous access is provided to adjacent storage racks on the same carousel, thereby increasing the selection of articles an operator of the system might have from a single work station.

It is another object of the present invention to provide a storage and retrieval system in which the access to the storage compartments of the storage rack is provided on the sides of the storage rack.

It is another object of the present invention to provide a storage and retrieval system in which at least two elongate carousels with storage racks having access on the sides thereof are arranged next to one another such that access to four storage racks, two from each carousel, is possible from a single work station.

It is another object of the present invention to provide a storage and retrieval system having storage racks with storage compartments on the sides as well as the front thereof.

It is another object of the present invention to provide a storage and retrieval system in which only a few storage racks travel in a small circular path, and provide access to the storage areas of each storage rack from the sides thereof, thereby providing quick and ready access to any two storage racks from several work stations around said circular path.

It is another object of the present invention to provide a storage and retrieval system requiring less area than conventional systems by virtue of the structure and arrangement of the storage racks on said storage and retrieval system.

The above and other objects of the present invention can be realized by a storage and retrieval system having a plurality of storage racks arranged one adjacent another on a frame, each storage rack having at least one storage compartment and being so arranged on the frame as to be movable along a path, a portion of which is arcuate, between a storage position and an access position on the arcuate portion of the path, and whereby two adjacent storage racks can be arranged at the access position so that access can be gained to the storage compartments of both storage racks from a single work station. The present invention can also be realized by a storage and retrieval system having a frame, and a plurality of storage racks, each of which has first and second sides and a storage compartment on at least one of such sides. Such storage racks are arranged on the frame so that the storage compartment of at least one storage rack is adjacent the storage compartment of another storage rack. The storage racks are moveable between storage positions and access positions where access can be gained to the storage compartments of two adjacent storage racks.

BRIEF DESCRIPTION OF THE DRAWINGS

The foregoing and other objects of the present invention will become apparent, as will a better understanding of the concepts underlying the present invention, by reference to the description which follows and refers to the accompanying drawings in which.

DETAILED DESCRIPTION OF THE INVENTION

Figure 1:
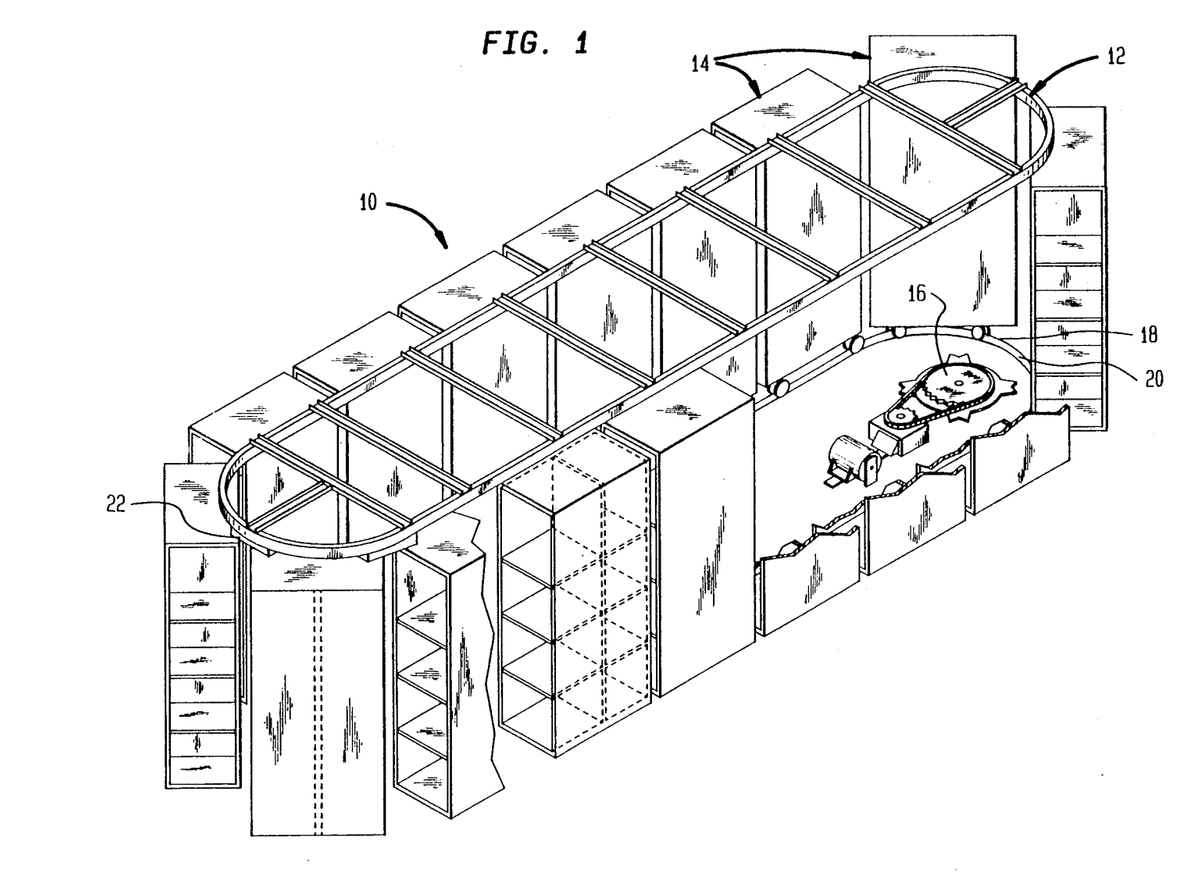
FIG. 1 is a perspective view of a storage and retrieval carousel in accordance with the present invention.

Referring to the figures, FIG. 1 shows a storage and retrieval carousel generally designated as 10 in accordance with the present invention. The carousel 10 is a bottom drive horizontal carousel which includes a frame structure 12 and a plurality of storage racks 14 moveably connected to said frame structure 12. The frame structure 12 is an oblong structure being made up of two semi-circular end portions connected by two elongate portions therebetween. Drive means 16 is shown in the broken away area of FIG. 1, as are rollers 18 and guide track 20. A guide bar 22 facilitates the suspension and/or support of the individual storage racks at the frame structure 12.

Of course, though a bottom drive system is shown herein, any suitable arrangement of guide means, drive means or support means may be employed to provide the desired path of movement of the storage racks 14. For instance, the storage racks can be suspended entirely from a frame structure on which upper drive means and guide means move the same.

Figure 2:
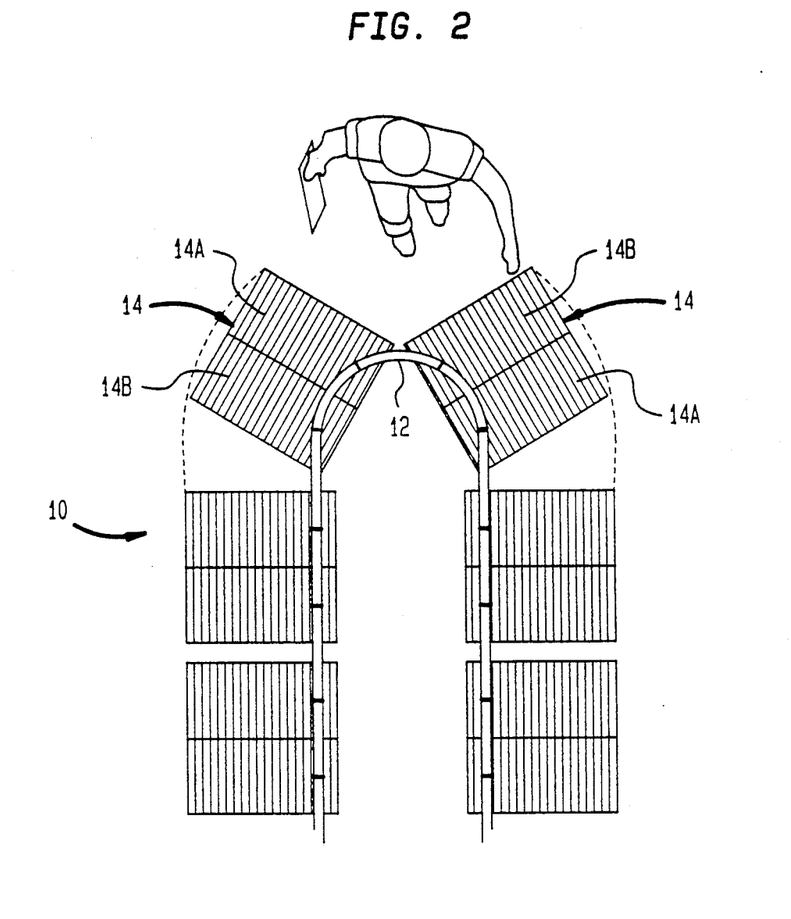
FIG. 2 is a schematical top plan view of a portion of a storage and retrieval carousel in accordance with the present invention, illustrating an operator's access to adjacent storage racks.
Figure 3:
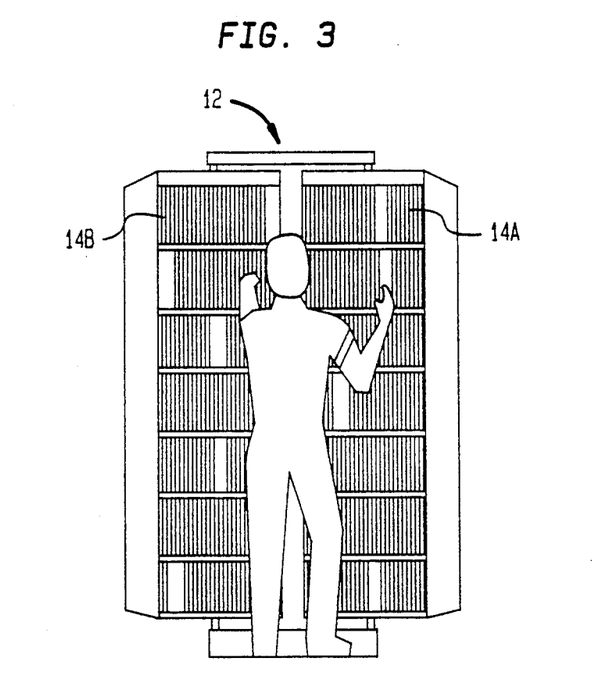
FIG. 3 is a front elevational view of a storage a retrieval carousel in accordance with the present invention illustrating an operator's access to two adjacent storage racks.

The storage racks 14 in the preferred embodiment are box-like members which, in one preferred embodiment, are enclosed on their top, bottom, front and rear sides. Of course, the sides can, in other embodiments, be open on the sides as in the case of cantilevered shelving. Several storage compartments are provided on the sides of each storage rack 14, thereby providing access to articles stored therein from either side of the storage rack. Thus, each storage rack 14 provides a storage compartment 14A and a storage compartment 14B, these storage compartments being separated by a divider. The storage compartments shown in the drawings are shown full with files or like items (that is, in the form of lines from the sides of the storage compartments to the divider therebetween). As seen in FIG. 3, certain items have been removed from storage compartment 14B of the storage rack on the left and storage compartment 14A of the storage rack on the right.

Since the storage racks are closely juxtaposed on the elongate portions of the carousel 10, no access is available when the racks are on these elongate portions. When on these elongate portions, the racks are not only in a storage position, but can also be considered to be in a security position at which there is no access to the items stored therein. In regard to the latter, the racks can be arranged so that the only racks having exposed storage compartments store items which do not require such security In the alternative, lockable closures can be provided on such storage compartments, or there can be provided no access openings thereon. Of course, the control means would have to be secured as well.

In any event, the storage racks 14 are so arranged on the frame structure 12 that when the storage racks are at or adjacent to the semi-circular portions of the path of movement, access can be gained not only to one storage rack 14, but also to an adjacent storage rack 14. Accordingly, the operator of the carousel 10 can gain access to storage compartments 14A and 14B of the two adjacent storage racks 14 from a single work station, as shown in FIGS. 2 and 3. This structure and arrangement thus enables the operator to choose items from both storage racks. Therefore, the operator of the carousel 10 now has the capability of making less "call-ups" to locate multiple items, products or components stored in the storage racks 14. That is, the stored items could be so arranged that items which are typically needed at the same time could be provided in adjacent storage racks, and such adjacent storage racks can be indexed to an access area or single work station.

This structure and arrangement further provides the capability of using less of the expensive factory or office area for a large storage capacity since less area would be required for a carousel 10 alone or within a system. In a system, the structure and arrangement of a carousel in accordance with the present invention can provide, in some cases, fifty percent (50%) more capacity than conventional carousels. For instance, a system comprised of four conventional five foot wide carousels having eighteen storage racks each (72 total) can be used beneficially in an area of approximately 420 square feet (20'×21'). The storage racks on such a conventional carousel would be twelve inches deep and twenty-four inches wide. With the carousels in accordance with the present invention, it is possible to employ in the same area three carousels having eighteen storage racks each (54 total). Because of the structure and arrangement of the storage racks on the carousels in accordance with the present invention, the storage racks can be twenty-four inches deep and twenty-four inches wide. Accordingly, 50% more storage capacity is gained in the same floor space. In addition, there is 50% greater access to that which is stored in the storage racks, since the conventional system can only have four exposed access areas at a given time, while the system in accordance with the present invention can provide six exposed access areas at a given time.

Figure 6:
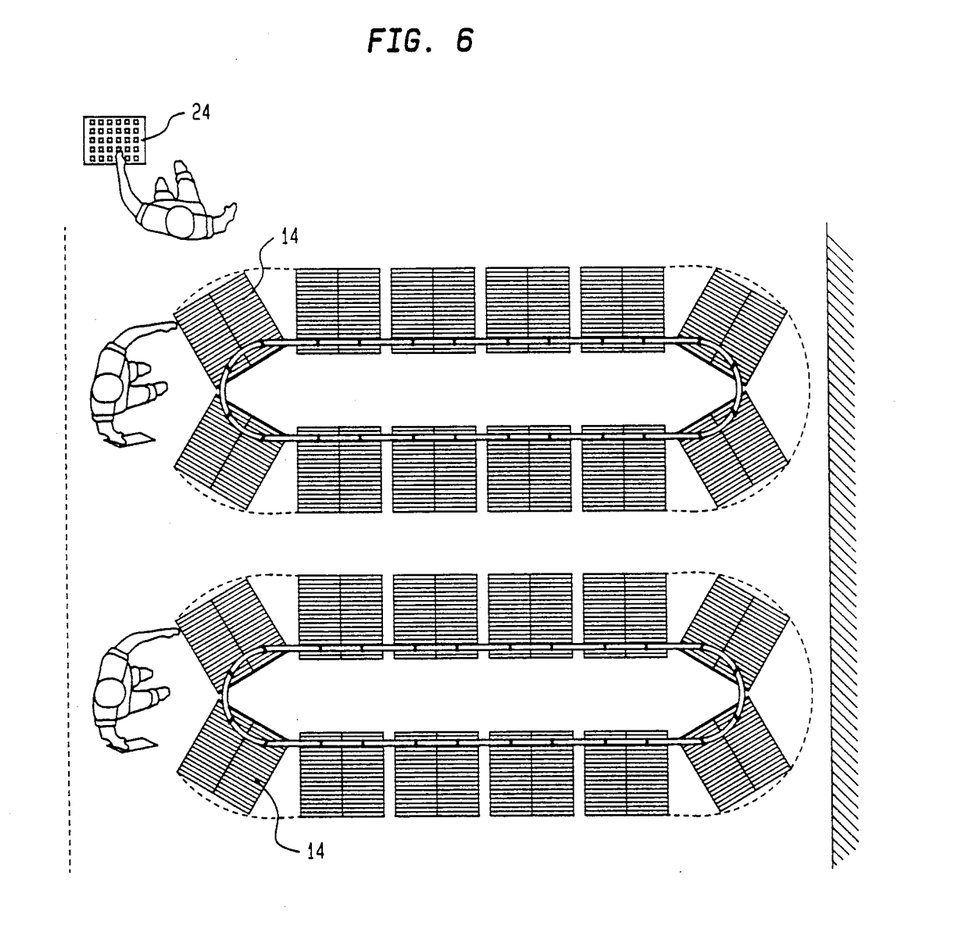
FIG. 6 is a schematical top plan view of a system of storage and retrieval in accordance with another embodiment of the present invention, illustrating the operation of such system which comprises at least two storage and retrieval carousels.

Reference is made to FIG. 6 in which an imaginary wall is shown in dashed formation at the access end of two adjacent carousels. As can be seen, when two storage racks 14 are indexed to the access position, they together form an inverted V-shaped area in which the operator can work to gain access to the storage compartments of both storage racks 14. If, however, access to the storage compartments was only provided on the front of the storage racks 14, there would be little room for the operator to maneuver and manipulate the items stored therein. Reference is made to the opposite ends of the carousels shown in FIG. 6, both of which show in dashed formation the path of movement of the storage racks 14 next to a wall.

It can also be seen in FIG. 6 that a control panel 24, computerized or otherwise automated, can be employed by the operator to index the desired storage racks 14.

Another advantage of the structure and arrangement of the storage racks 14 is the capability of doubling the storage area in the storage racks themselves. That is, the storage racks can now be made wider and/or deeper since there are dividers which make for two storage compartments, at which there is access from either side. With access from the front only, the storage racks can be made of only a certain depth since it becomes increasingly difficult to reach towards the back of the storage compartment. Also, the size of storage racks of conventional carousels are limited because the racks must negotiate the semi-circular arc at the end of the carousel. Thus, the wider a rack is made, the larger the arc must be. Moreover, the storage compartments can now be specifically shaped and sized to accommodate particular items. For instance, the depth of the storage compartments from either side of each storage rack 14 can be sized to fit the length of a file folder.

Figure 4:
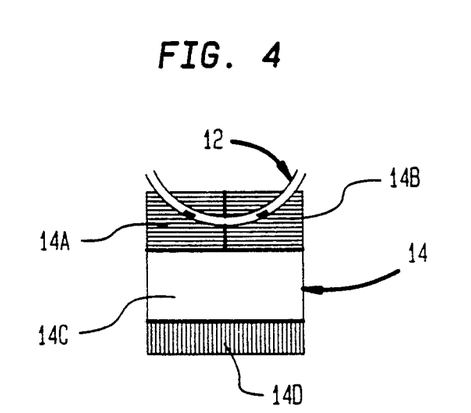
FIG. 4 is a schematical top plan view of a storage rack in accordance with the present invention.

FIG. 4 shows a storage rack 14 having four different types of storage compartments. Storage compartments 14A and 14B are as shown in FIGS. 1, 2 and 3. Specifically, storage compartment 14A can be accessed from the left side of the storage rack 14 and the storage compartment 14B can be accessed from the right side of the storage rack 14—there being a divider between such storage compartments. In addition, a storage compartment 14C is provided with no divider, and therefore access thereto can be gained from either the right or left side of the storage rack 14. Lastly, storage compartment 14D is on the front of the storage rack 14. This may be utilized to store small components or to store data information cards, out cards, index cards and the like for the stock in the respective storage rack.

Figure 5:
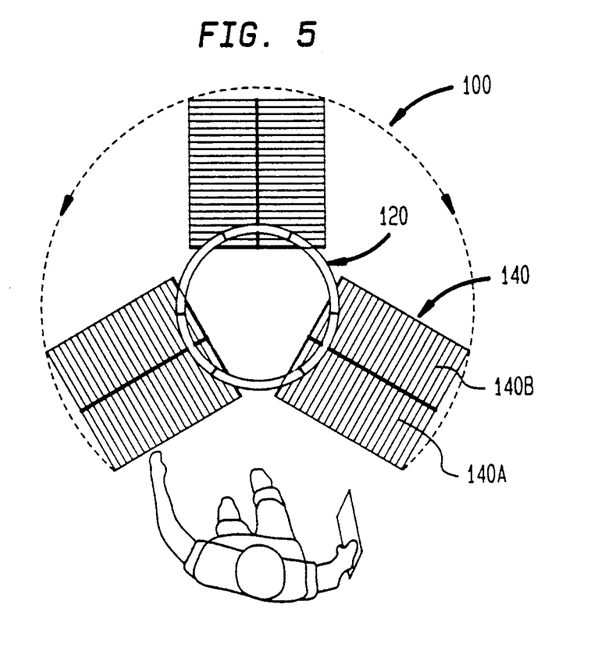
FIG. 5 is a schematical top plan view of a storage retrieval carousel in accordance with another embodiment of the present invention.

In a further embodiment of the carousel system in accordance with the present invention, FIG. 5 shows a carousel 100 which provides a circular frame structure 120 to provide a circular path of movement for the three moveably connected storage racks 140 having storage compartments 140A and 140B. Among the advantages which flow from this particular embodiment of the present invention is the capability of providing quick and ready access to two of the storage racks 140 from several work stations about the carousel 100. Oftentimes, a storage and retrieval or test application calls for the operator of a carousel to be in several work locations within a confined area. This embodiment of the present invention provides a carousel 100 which enables the operator to move freely about the carousel while maintaining the capability of quickly accessing items from any of the storage racks thereon.

Figure 7:
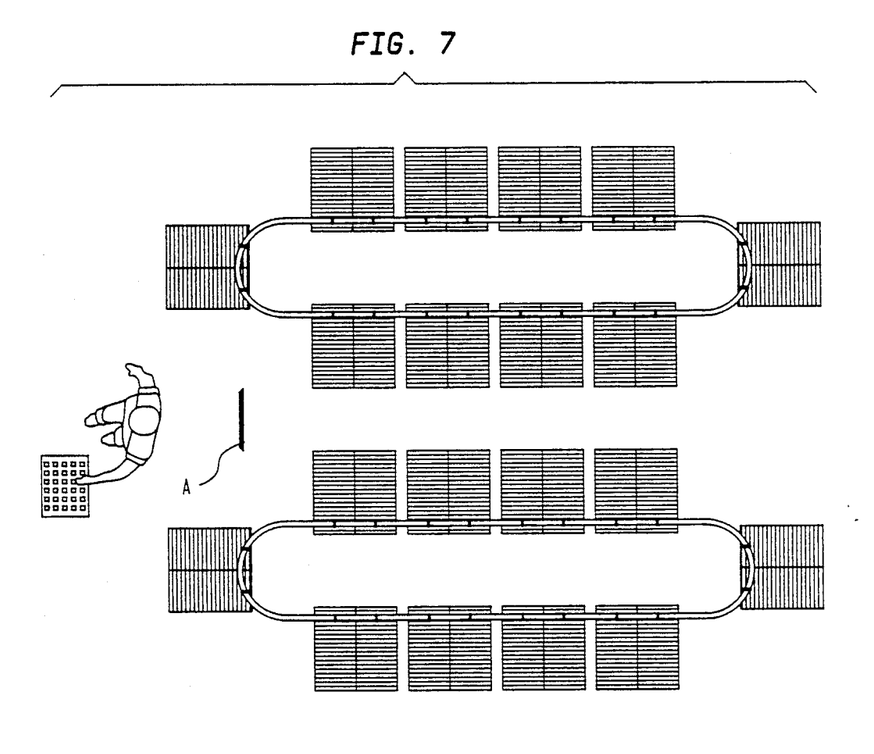
FIG. 7 is a schematical top plan view of a system of storage and retrieval in accordance with yet another embodiment of the present invention, illustrating the capability of obtaining access to four storage racks, two from each carousel, from a single work station.

Many permutations of the present invention are possible to provide useful systems for many applications in the manufacturing and service related industries. As noted above, the present invention increases storage capacity and productivity, and can also facilitate product testing. In addition to the above described systems, the system illustrated in FIG. 7 is quite useful in any one of these applications. FIG. 7 illustrates two carousels arranged adjacent one another and adjacent a control location at which a control panel is provided. Also provided is a single access station A located between the semi-circular end portions of each carousel. When properly indexed by the operator at the control panel, the storage racks are moved until the desired storage racks on each carousel are in the positions shown in FIG. 7. When in this arrangement, the operator of the system can simply step from the control panel into the access position A, whereby access can be gained to four storage compartments of four different storage racks—two from each carousel.

While the foregoing description and figures illustrate preferred embodiments of the storage and retrieval system in accordance with the present invention, it should be appreciated that certain modifications can be made, and are indeed encouraged to be made, in materials, structure and arrangement of the disclosed embodiments without departing from the spirit and scope of the present invention which is intended to be captured by the claims set forth below.

What is claimed is:

1. A storage and retrieval apparatus, said apparatus comprising:
   a. a frame; and
   b. a plurality of storage racks arranged one adjacent another on said frame, at least two adjacent storage racks each having at least one storage compartment and each being so arranged on said frame as to be movable along a path between a storage position for storing articles and an access position, at least a portion of said path being arcuate, said access position of said at least two adjacent storage racks being on or adjacent said arcuate portion of said path, and said at least two adjacent storage racks being constructed and arranged with respect to each other and said frame such that the at least one storage compartment of each said at least two adjacent storage racks can be accessed from the access position at the same time.

2. The apparatus in claim 1, wherein said path of movement of said storage racks is endless, and further comprising guide means operatively connecting said storage racks to said frame for guiding said storage racks along said endless path of movement.

3. The apparatus in claim 2, wherein said storage racks are so arranged with respect to said frame and said guide means that said storage racks are movable along said endless path together.

4. The apparatus in claim 3, further comprising drive means for moving said storage racks in said endless path.

5. The apparatus in claim 4, further comprising control means for activating said drive means to index desired storage racks to an access position.

6. The apparatus in claim 5, wherein each said storage rack has first and second sides and a front, the sides of each storage rack being adjacent the sides of adjacent storage racks, and each said storage rack has at least a first storage compartment on said first side and a second storage compartment on said second side.

7. The apparatus in claim 6, wherein said frame and guide means are so constructed and arranged that said endless path is circular, whereby said access position is located anywhere around said circular path adjacent a desired work station.

8. The apparatus in claim 6, wherein said frame and said guide means are so constructed and arranged that said endless path is oblong and includes at least a first arcuate portion and a second arcuate portion connected by at least two elongate portions.

9. The apparatus in claim 8, wherein said first and second arcuate portions are semi-circular and said at least two elongate portions are substantially parallel straight paths.

10. The apparatus in claim 1, wherein each said storage rack has a first side, a second side, a front, a first storage compartment on said first side and a second storage compartment on said second side.

11. The apparatus in claim 10, wherein at least a portion of said storage racks include a third storage compartment on said front.

12. The apparatus in claim 10, wherein said frame and guide means are so constructed and arranged that said endless path is circular, whereby said access position is located anywhere around said circular path adjacent a desired work station.

13. The apparatus of claim 10, wherein said frame and said guide means are so constructed and arranged that said endless path is oblong and includes at least a first arcuate portion and a second arcuate portion connected by at least two elongate portions.

14. The apparatus of claim 13, wherein said first and second arcuate portions are semi-circular and said at least two elongate portions are substantially parallel straight paths.

15. The apparatus in claim 10, wherein said fronts of at least a portion of said storage racks are closed, providing no access to said storage compartments.

16. The apparatus in claim 1, wherein said storage racks are arranged on said frame such that the storage compartment of at least one storage rack is adjacent the storage compartment of another storage rack.

17. An apparatus for the storage, transportation and retrieval of articles, said apparatus comprising:
   a. a frame; and
   b. a plurality of storage racks having first and second sides and a storage compartment on at least one of said first side or said second side, said storage compartment of at least one storage rack is adjacent the storage compartment of another storage rack, and wherein each said storage rack is movable along a path between storage positions at which articles are stored in a storage compartment thereof and an access position, at least a portion of said path being arcuate and wherein said access position is on or adjacent said arcuate portion of said path so that when two adjacent storage racks are at access positions, access can be gained to the storage compartments thereof from a single work station.

18. The apparatus in claim 17, wherein at least a portion of said storage racks have storage compartments on both said first side and said second side thereof.

19. The apparatus in claim 17, wherein each storage rack has storage compartments on both said first side and said second side thereof, such that each storage compartment on a given storage rack is adjacent a storage compartment of another storage rack.

20. The apparatus in claim 19, wherein at least a portion of said storage racks have a front which connects said first and second side, and a storage compartment on said front.

21. An apparatus for the storage, transportation and retrieval of articles, said apparatus comprising:
   a. a frame; and
   b. a plurality of storage racks having first and second sides and a compartment, at least a portion of said storage racks having storage compartments on both said first side and said second side thereof, at least a portion of said storage racks having a front which connects said first side and said second side, and a storage compartment on said front, said storage racks being arranged on said frame such that the storage compartment of at least one storage rack is adjacent the storage compartment of another storage rack, and wherein each said storage rack is movable between storage positions at which articles are stored in a storage compartment thereof and an access position at which access can be gained to the storage compartments of two adjacent storage racks.

22. The apparatus in claim 17, wherein said first and second sides are so constructed and arranged so as to provide access to said storage compartment from either side.

23. An apparatus for the storage, transportation and retrieval of articles, said apparatus comprising:

a frame; and b. a plurality of storage racks having first and second sides and a storage compartment on at least one of said first side or said second side, said storage racks being arranged on said frame such that the storage compartment of at least one storage rack is adjacent the storage compartment of another storage rack, and guide means operatively connecting said storage racks on said frame for guiding the movement of said storage racks along an endless path, wherein each said storage rack s movable along said endless path between storage positions at which articles are stored in a storage compartment thereof and an access position at which access can be gained to the storage compartments of two adjacent storage racks.

24. The apparatus in claim 23, wherein said endless path is circular.

25. The apparatus in claim 24, wherein at least a portion of said storage racks have storage compartments on both said first side and said second side thereof.

26. The apparatus in claim 24, wherein each storage rack has storage compartments on both said first side and said second side thereof, such that each storage compartment on a given storage rack is adjacent a storage compartment of another storage rack.

27. The apparatus in claim 26, wherein at least a portion of said storage racks have a front which connects said first and second side, and a storage compartment on said front.

28. The apparatus in claim 23, wherein said endless path is oblong, including a first semi-circular path and a second semi-circular path connected by two elongated paths, wherein said access position is adjacent one of said first or second semi-circular paths.

29. The apparatus in claim 28, wherein at least a portion of said storage racks have storage compartments on both said first side and said second side thereof.

30. The apparatus in claim 28, wherein each storage rack has storage compartments on both said first side and said second side thereof, such that each storage compartment on a given storage rack is adjacent a storage compartment of another storage rack.

31. The apparatus in claim 30, wherein at least a portion of said storage racks have a front which connects said first and second side, and a storage compartment on said front.

32. A storage transportation and retrieval system, said system comprising:

a. a first storage and retrieval carousel including:
 i. an oblong frame having two semi-circular ends and two elongate portions connecting said ends;
 ii. a plurality of storage racks having first and second sides and a storage compartment on at least one of said first side or said second side, said storage racks being arranged on said frame such that the storage compartment of at least one storage rack is adjacent the storage compartment of at least one other storage rack, and wherein each said storage rack is movable along an oblong path defined by said oblong frame, whereby said storage racks are in a storage position when juxtaposed on said elongate portion of said path and each said storage rack is at an access position when on or adjacent said semi-circular path at which access can be gained to the storage compartment thereof and the storage compartment of an adjacent storage rack; and b. a second storage and retrieval carousel of substantially similar construction as said first storage and retrieval carousel, said second storage and retrieval carousel being arranged adjacent said first storage and retrieval carousel along the elongate portions thereof.

33. The system in claim 32, wherein the storage racks on said first and second carousels are so constructed and arranged that two storage racks on each said carousel can be indexed to access positions such that access can be gained to four storage racks from a single work station between said first and second carousel.

34. A method of storing and retrieving articles in and from a storage and retrieval apparatus having a frame, and a plurality of storage racks arranged one adjacent another on the frame wherein at least two adjacent storage racks each have at least one storage compartment and are so arranged on the frame so as to be movable along a path between a storage position for storing articles and an access position at which access is provided to the at least one storage compartment, said method including the steps of:

a. moving said two adjacent storage racks in an arcuate path to an access position such that the at least one storage compartment of each such adjacent storage rack can be simultaneously accessed from the access position; and b. removing, while in the access position, articles stored in at least one of the at least one storage compartment of each such adjacent storage rack.

35. The method of claim 34, further comprising the steps of inserting, while in the access position, articles into at least one of the at least one storage compartment of each such adjacent storage rack, and storing such articles at a storage position until such time as such articles are needed.

36. The method of claim 34, wherein articles are removed from both of the at least one storage compartment of each such adjacent storage rack.

37. The method in claim 34, wherein the two adjacent storage racks are moved together in the arcuate path.

38. The method in claim 34, wherein each storage rack of the plurality of storage racks has at least one storage compartment such that the movement of any two adjacent storage racks in an arcuate path provides access from a single access position to at least one storage compartment of each such adjacent storage rack.

* * * * *

UNITED STATES PATENT AND TRADEMARK OFFICE
CERTIFICATE OF CORRECTION

PATENT NO. : 5,065,872

DATED : November 19, 1991

INVENTOR(S) : David Simon

It is certified that error appears in the above-identified patent and that said Letters Patent is hereby corrected as shown below:

Column 3, line 58, third occurrence of "a" should read --and--.

Column 3, line 64, after "storage", insert --and--.

Column 6, lines 58-59, "rack-s" should read --racks--.

Column 8, line 20, after third occurrence of "said", insert --storage racks being arranged on said frame such that the--.

Column 9, line 11, "rack s" should read --rack is--.

Signed and Sealed this

Ninth Day of March, 1993

Attest:

STEPHEN G. KUNIN

Attesting Officer

Acting Commissioner of Patents and Trademarks